United States Patent [19]

Maier et al.

[11] Patent Number: 4,969,050
[45] Date of Patent: Nov. 6, 1990

[54] CIRCUIT ARRANGEMENT FOR DISTRIBUTING AN ANTENNA SIGNAL TO TWO APPLIANCES

[75] Inventors: Gerhard Maier, Dauchingen; Bertram Fischer, Deisslingen, both of Fed. Rep. of Germany

[73] Assignee: Deutsche Thomson-Brandt GmbH, Schwenningen, Fed. Rep. of Germany

[21] Appl. No.: 235,668

[22] Filed: Aug. 24, 1988

[30] Foreign Application Priority Data

Aug. 26, 1987 [DE] Fed. Rep. of Germany ....... 3728381

[51] Int. Cl.⁵ .............................................. H04N 5/76
[52] U.S. Cl. ...................................... 358/335; 455/6; 455/249
[58] Field of Search ..................... 455/6, 249; 358/335

[56] References Cited

U.S. PATENT DOCUMENTS

| | | | |
|---|---|---|---|
| 4,843,637 | 6/1989 | Shimura et al. | 455/247 |
| 4,856,082 | 8/1989 | Kasa | 455/249 |

Primary Examiner—Robert L. Richardson
Attorney, Agent, or Firm—Max Fogiel

[57] ABSTRACT

A circuit arrangement for distributing an antenna signal to input terminals of two appliances. One of these appliances is connected to a variable frequency modulator. An attenuating filter stage is connected between a pre-amplifier and the input of the appliance that is connected to the modulator. The pre-amplifier receives and amplifies the antenna signal. The attenuating filter stage is a frequency trap which has a trapping frequency that is identical to the modulator frequency and is synchronized with tuning of the modulator frequency. The attenuating filter stage, furthermore, is always exactly tuned to the frequency of the modulator and has a tuned frequency that is always aligned in parallel to the frequency of an oscillator in the modulator, so that modulation is not present.

2 Claims, 1 Drawing Sheet

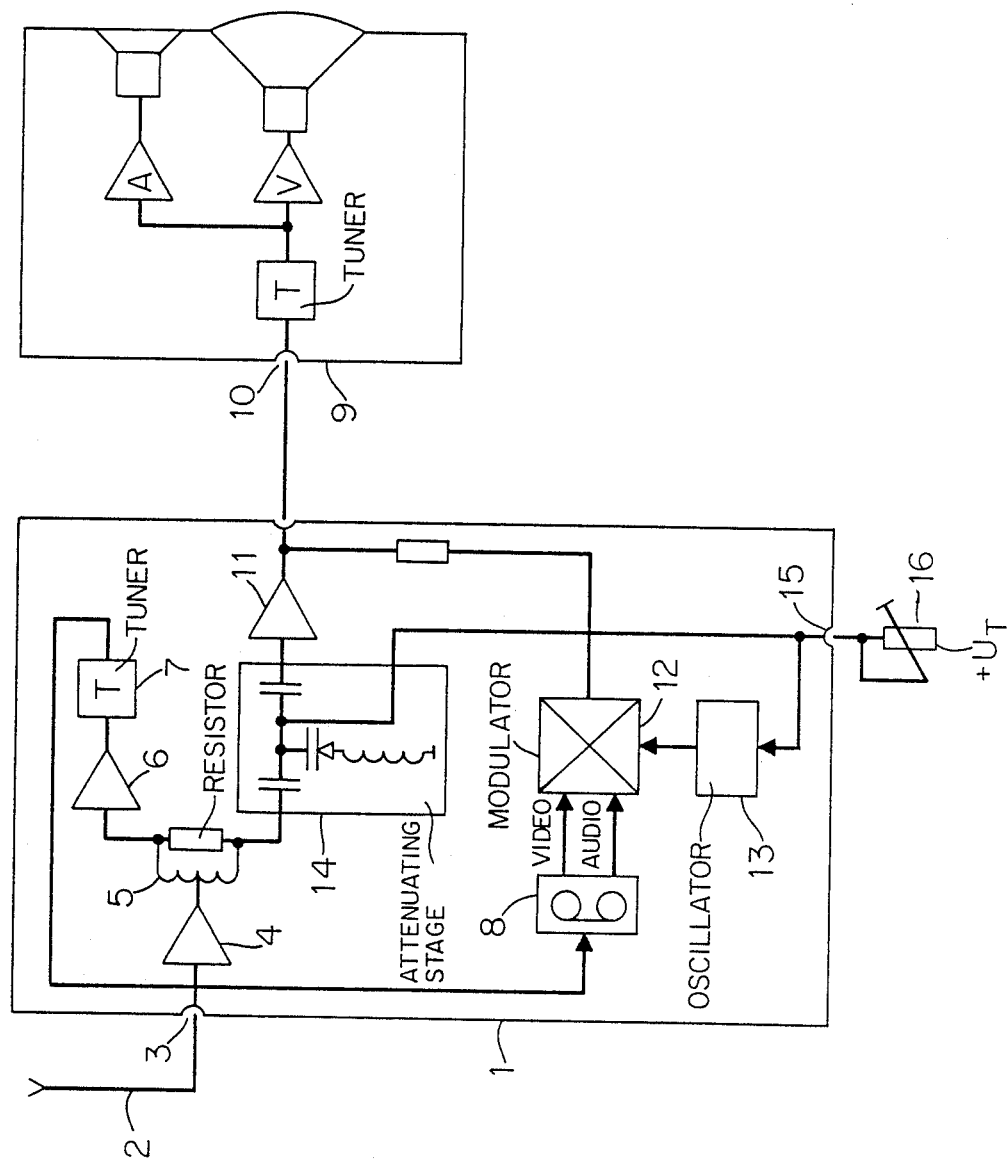

CIRCUIT ARRANGEMENT FOR DISTRIBUTING AN ANTENNA SIGNAL TO TWO APPLIANCES

The invention concerns circuitry for distributing an antenna signal to the input terminals of two appliances, whereby a variable-frequency modulator is connected to an input terminal of one of the appliances.

Circuitry of this type is conventional in connecting a video recorder to a television receiver for example, with the antenna signal being applied by way of a directional coupler in the video recorder both to the antenna-input terminal of the tuner in the television receiver and to the antenna-input terminal of the tuner in the video recorder. Wired in parallel with the television-receiver is a modulator that converts the video and audio components of a video recorder signal into a frequency within the television-reception band. There are, however, many transmitters that employ the same tuning range as the modulator and superimpose signals on top of the signals deriving from the video recorder and stored by way of the modulator, causing interference that appears on the screen in the form of moire patterns. Although the modulator is variable-frequency, the interference cannot be eliminated from all channels when the modulator frequency is at one and the same setting. The interference can be eliminated by switching off all the television channels during video-recorder operation or by providing a switch to turn off the video-recorder antenna-input terminal. This approach, however, demands a high-frequency switch appropriate for the 50–900 MHz range, which is very expensive and impractical.

The object of the invention is to eliminate the interference without resort to a switch of the aforesaid type. This object is attained by the invention recited in the claim.

The invention will now be specified with reference to the FIGURE.

A video recorder 1 forwards the antenna signals supplied to an antenna-input terminal 3 from an antenna 2 to a tuner 7 by way of an antenna-signal pre-amplifier 4, a directional coupler 5, and an amplifier 6. These signals are processed and recorded on a magnetic tape 8. To play television signals on the screen of a television receiver 9, the antenna signals are forwarded to the receiver's antenna-input terminal 10 by way of directional coupler 5 and another amplifier 11. To play recorded video and audio signals back they are forwarded to antenna-input terminal 10 through a modulator 12. The carrier frequency can be varied to a certain extent by means of an oscillator 13 in order to tune them to one of the reception channels in television receiver 9. An attenuating stage 14 is in accordance with the invention connected to the memory section of television receiver 9. The attenuating stage in this embodiment is a frequency trap with a trapping frequency that is synchronized with the modulator frequency. For this purpose the tuning voltage that is applied to an input terminal 15 by way of controls 16 in order to tune oscillator 13 is simultaneously applied to attenuating stage 14, with the tuning voltage adjusting the trapping frequency in synchronization with the tuning of oscillator 13. This ensures that the antenna signal will always be optimally reduced independently of the oscillator tuning, also eliminating any influence between the antenna signal and the modulator signal.

We claim:

1. A circuit arrangement for distributing an antenna signal to input terminals of two appliances, comprising: a variable-frequency modulator connected to an input terminal of one of said appliances; a pre-amplifier for receiving and amplifying an antenna signal; an attenuating filter state connected between said pre-amplifier and said input terminal of said one of aid appliances connected to said modulator; said attenuating filter stage being a frequency trap having a trapping frequency identical to the modulator frequency and synchronized with tuning of said modulator frequency; an oscillator in said modulator, said attenuating filter state being always exactly tuned to the frequency of said modulator and having a tuned frequency always aligned in parallel to the frequency of said oscillator so that modulation is not present.

2. A circuit arrangement for distributing an antenna signal to input terminals of two appliances, comprising: a video recorder; an antenna for receiving antenna signals; a pre-amplifier connected to said antenna; a directional coupler having an input connected to an output of said pre-amplifier; an amplifier connected to an output of said directional coupler; a tuner with input connected to an output of said amplifier, said video recorder forwarding said antenna signals received by said antenna to said tuner through said pre-amplifier, directional coupler, and said amplifier; means for processing said antenna signals and recording on magnetic tape; a television receiver with a screen for playing television signals thereon, said receiver having an antenna input for receiving said antenna signals through said directional coupler and another amplifier; a modulator connected to said antenna input terminal of said receiver for playing back recorded video and audio signals; said modulator having an oscillator and a carrier frequency that can be varied by said oscillator for tuning to a reception channel in said television receiver; memory means in said television receiver; an attenuating filter state connected to said memory means; said attenuating filter stage being a frequency trap having a trapping frequency synchronized with the modulator frequency; means for applying a tuning voltage simultaneously to said oscillator and said attenuating filter stage, said tuning voltage adjusting said trapping frequency in synchronization with tuning of said oscillator for optimally reducing the antenna signal independently of said oscillator tuning and eliminating influences between said antenna signal and said modulator.

* * * * *